Figure 2A:
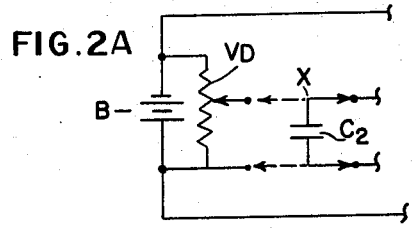

Jan. 5, 1960 G. V. A. GUSTAFSSON 2,920,274
METHOD OF AND APPARATUS FOR INSERTING
A VOLTAGE INTO AN ELECTRICAL CIRCUIT
Filed Feb. 10, 1954 2 Sheets-Sheet 1

Gotthard Viktor Arnold Gustafsson
INVENTOR.

BY
Pierce Scheffler & Parker
Attorneys

United States Patent Office 2,920,274
Patented Jan. 5, 1960

2,920,274

METHOD OF AND APPARATUS FOR INSERTING A VOLTAGE INTO AN ELECTRICAL CIRCUIT

Gotthard Viktor Arnold Gustafsson, Bromma, Sweden

Application February 10, 1954, Serial No. 409,450

Claims priority, application Sweden February 28, 1953

4 Claims. (Cl. 324—98)

My invention relates to a method of inserting voltage differences into an electrical circuit and apparatus for measuring voltage differences.

One of the principal objects of this invention is to insert voltage differences on arbitrary places in a D.C. circuit without affecting the potential level of the connecting points.

Another object of the invention is to provide an electrical circuit, where voltage differences are inserted in a D.C. coupling, the potential level of the connecting points not being affected.

A further object of the invention is to provide an apparatus for measuring small voltage differences.

Still another object of the invention is to provide an apparatus for measuring voltage differences by means of bridge couplings.

Other objects and advantages of the invention will be apparent during the course of the following description.

One of the most important advantages of using A.C. instead of D.C. is, that one is able to insert voltage differences (E.M.F.'s) on arbitrary places in a circuit by means of transformers without affecting the potential level of the connection points in any other way and that these voltage differences are proportional to the voltage of the common source of current. In D.C.-circuits such voltage differences cannot be inserted from a common source of current without at the same time affecting the potential level of the connection points.

Several sources of current independent of each other could, of course, be inserted into such a D.C.-circuit, but then follows the inconvenience that the different voltages do not vary with the elapse of time in the same way. In order to improve this condition it is convenient to use some manner of "standardization," whereby the different sources of current by a special procedure at certain intervals are adjusted in such a way, that their voltages stand in a fixed relation to each other. This procedure is rather intricate and cannot be carried out too often, so that deviations are unavoidable.

According to the present invention an almost continuous adjustment of the sources of current in relation to each other can be made by means of having all the sources of current except one (the main source) substituted by storage condensers (secondary sources) which are charged from the main source by means of a feeding device consisting of intermediate or transfer condensers and switches, whereby the main source is never directly connected to the secondary sources. One can also insert by this method an arbitrary, smaller voltage (E.M.F.) into a circuit using a voltage divider across the main source which transfers an arbitrary part of the voltage of the main source. Thus one has the same possibilities to dispose the secondary sources (they can be added to get higher voltages than that of the main source) as one has in using transformers. At the same time one has avoided the disadvantages which are met with in measurements of A.C. in the shape of phase errors and disturbances of inductive and capacitive type.

The invention can be applied to D.C.-circuits and also to all A.C.-circuits which contain one or more transformers or secondary transformer windings. Especially in bridge circuits, where one often has difficulties in the balancing due to phase errors and other disturbances, the invention seems to have a great task to fulfill.

The invention can be used to advantage in measuring and recording small differences in D.C.-voltages, which are situated on varying potential levels. For such measurements there are instruments of the bridge type on the market which include in the bridge output circuit a galvanometer or voltage meter connected in series with a measuring potentiometer. The potentiometer voltage is adjusted so that it is exactly equal and opposite to the bridge output voltage, in which case the galvanometer will then read zero. Thus the amount to which the potentiometer has to be adjusted to obtain a zero reading on the galvanometer constitutes a measurement of the unbalance in the bridge. The galvanometer can be combined with an electric motor, which is governed by the voltage difference in the bridge diagonal so that the bridge circuit is automatically balanced. The instrument can be completed with a recording device and/or means for performing special operations. In measuring with such instruments the long leads between the pickup, for instance a strain gauge, and the measuring instrument, which contains the remaining part of the bridge, cause measuring errors due to changes in the resistance of the leads. In order to avoid such errors it is important to locate all the four resistors of the bridge on or close to the test specimen. Now existing recorders can be used for measurements of this kind (full-bridge measurements) only by means of complicated devices for standardization.

According to the invention the bridge type instrument is equipped with an improved potentiometer circuit which is fed by current from a condenser which is successively charged from the main source using a feeding device consisting of intermediate condensers and vibrators. The vibrators consist of double-throw-over switches, which alternatingly connect the intermediate condensers to the main source and to the secondary condensers. The switching is made in such a way that the main source is never directly connected to the secondary sources. The switches can be driven by A.C. or mechanically. The switching frequency should be maintained sufficiently high so that reasonable values of the capacity of the condensers can be kept. In certain cases it might be better to connect, parallel with the secondary condenser, auxiliary batteries which deliver the main part of the current in the compensating circuit.

Figure 2:
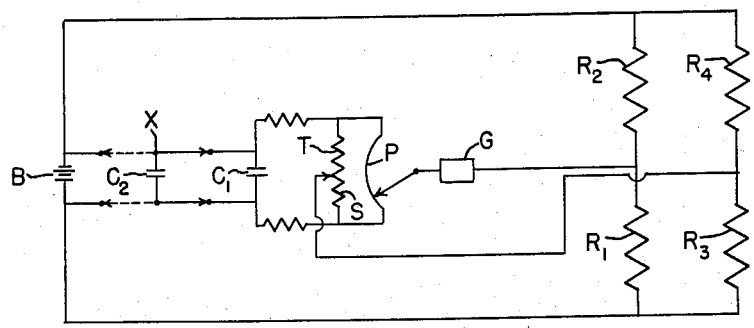
Figure 1:
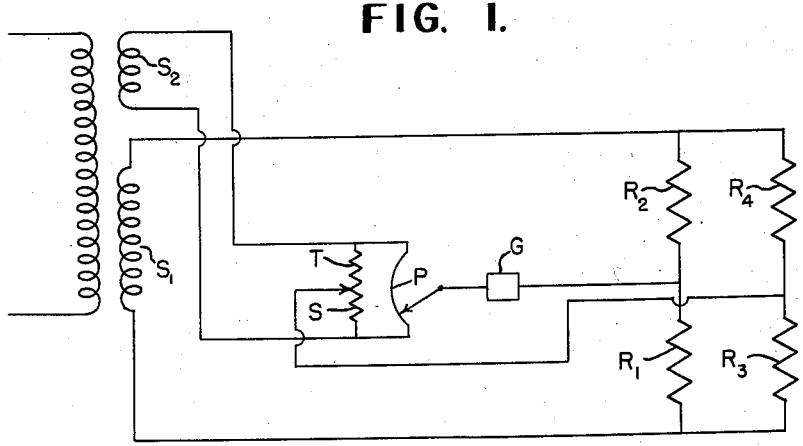

In the accompanying drawings, Fig. 1 is a circuit diagram illustrating a conventional circuit arrangement; Fig. 2 is a circuit diagram illustrating the changes necessary in the Fig. 1 circuit to effect the present invention; and Figs. 2a, 3, 4 and 5 are also circuit diagrams illustrating modifications of the invention.

In close relation to known methods a wiring diagram is shown in Fig. 1, where a measuring bridge is fed with A.C. from a transformer and a potentiometer circuit connected in the bridge output in series with the galvanometer G is fed from another secondary winding of the same transformer. Thus the measuring bridge, which consists of the four resistors $R_1$–$R_4$, is fed by the secondary winding $S_1$ of the transformer which is connected across one diagonal of the bridge. The output circuit of the bridge which is taken across the other diagonal includes galvanometer G, potentiometer P and paralleling variable resistance ST supplied with current from the secondary winding $S_2$. As is well known, when the normally balanced bridge $R_1$–$R_4$ becomes unbalanced due to a change in resistance of one of these resistors, a voltage appears across the output terminals of the bridge and causes deflection of the galvanometer G. The potentiometer P is then adjusted until the galvanometer again reads zero and hence the setting of potentiometer P is thus a measure of the bridge unbalance. Also, as well known, the purpose of variable resistor ST is to make it possible to change the zero position on the scale of potentiometer P if desired, for example, to have the zero position at the left end or in the middle of the scale, or have the zero-position on a desired calibration line on a recording chart paper. However, with the arrangement described, phase errors and also inductive and capacitive disturbances cannot be avoided.

The corresponding circuit designed according to the invention appears in Fig. 2, where the measuring bridge is fed by a D.C. source, a battery B, and the potentiometer in the output circuit of the bridge is fed from a storage condenser $C_1$, which in its turn is charged from the battery B over an intermediate or transfer condenser $C_2$. Between the condensers $C_1$ and $C_2$ there is a double throw-over switch X, which connects the intermediate condenser $C_2$ alternatingly to the battery and to the condenser $C_1$, in such a way that the condenser $C_1$ is never directly connected to the battery B. The four bridge resistors $R_1$–$R_4$ can all be placed on the measuring area at a certain distance from the measuring instrument and connected to the measuring instrument by means of cables or leads. When measuring, the potentiometer P is adjusted so that the galvanometer G is without current. If desired, a voltage divider VD can be connected across the battery B in the circuit of Fig. 2, as previously explained, and as indicated in Fig. 2a, in order to be able to vary the amount of the voltage taken from the main source.

The advantage of the invention, as applied to the bridge circuit illustrated is that it enables one and the same voltage source to be used to feed the bridge and also supply the potentiometer in the re-balancing circuit without ever being directly connected to the source and thus without affecting the potential level of the connection points. If the voltage of the source changes so also will be changed by the same amount the voltage applied to the potentiometer thus maintaining the calibration of the instrument.

Figure 4:
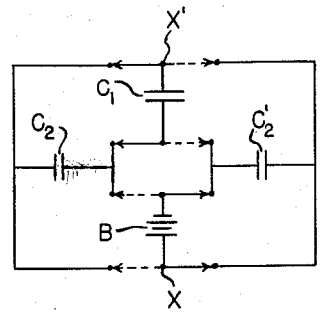
Figure 3:
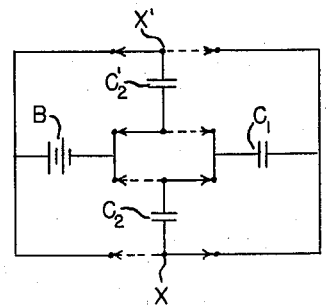

According to a modification of the invention, the condenser $C_1$ can be fed from the battery B by means of two intermediate condensers $C_2$ and $C_2'$. Thus in Figs. 3 and 4 are shown two alternative methods of wiring. For this, two double throw-over switches X and X' or one four throw-over switch is required. With this arrangement the frequency obtained for charging the condenser $C_1$ is doubled, and thus, correspondingly smaller variations in the voltage in the compensating circuit are achieved.

Figure 5:
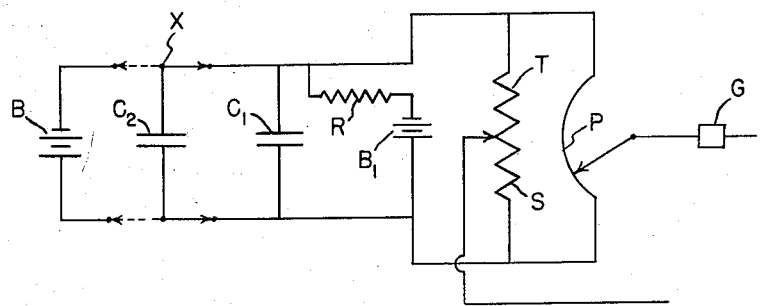

Finally, Fig. 5 shows the state when the main part of the current in the potentiometer-galvanometer circuit is delivered by an auxiliary battery $B_1$, which is connected in parallel to the condenser $C_1$. A resistor R must now be connected in series with the battery $B_1$.

The method according to the invention can not only be used for measuring and recording of resistance changes in D.C.-fed bridges, but can also be used for measuring eloctromotive forces, for instance, from thermocouples. It can also be used for regulating various processes.

It is to be understood that the forms of my invention, herewith shown and described, are to be taken as preferred examples of the same, and that various changes in the nature and arrangement of parts may be resorted to, without departing from the spirit of my invention, or the scope of the subjoined claims.

I claim:

1. An electrical circuit comprising an electrical measuring bridge including four interconnected bridge arms, input terminal means across one diagonal of said bridge and output terminal means across the opposite diagonal of said bridge, a voltage supply source of the direct current type connected to said input terminal means, a potentiometer having a resistance winding and an adjustable tap thereon, a galvanometer, an output circuit connected to said output terminal means for measuring the unbalance of said bridge, said output circuit including said galvanometer connected in series with the tapped portion of said potentiometer winding, and the voltage across said tapped portion being in series opposition to the voltage produced at said output terminal means, a storage condenser connected across said potentiometer winding to supply a voltage thereto, an intermediate condenser, and switching means arranged to connect both plates of said intermediate condenser alternatingly across said voltage supply source and across both plates of said storage condenser whereby said storage condenser receives its charging voltage from said intermediate condenser and is never connected directly to said voltage supply source.

2. An electrical measuring circuit as defined in claim 1 and which further includes an auxiliary voltage supply source of the direct current type and a resistor in series therewith, said auxiliary voltage supply source and resistor being connected across said storage condenser and located between said storage condenser and said potentiometer winding.

3. An electrical circuit comprising an electrical measuring bridge including four interconnected bridge arms, input terminal means across one diagonal of said bridge and output terminal means across the opposite diagonal of said bridge, a voltage supply source of the direct current type connected to said input terminal means a potentiometer having a resistance winding and an adjustable tap thereon, a galvanometer, an output circuit connected to said output terminal means for measuring the unbalance of said bridge, said output circuit including said galvanometer connected in series with the tapped portion of said potentiometer winding, and the voltage across said tapped portion being in series opposition to the voltage produced at said output terminal means, a storage condenser connected across said potentiometer winding to supply a voltage thereto, first and second intermediate condensers, and switching means arranged to connect the plates of said first and second intermediate condensers in alternation across said voltage supply source and in alternation across the plates of said storage condenser, said first intermediate condenser being connected across said voltage supply source while said second intermediate condenser is connected across said storage condenser, and said second intermediate condenser being connected across said voltage supply source while said first intermediate condenser is connected across said storage condenser, whereby said storage condenser receives its charging voltage in alternation from said intermediate condensers and is never connected directly to said voltage supply source.

4. An electrical circuit comprising a voltage supply source, a storage condenser for supplying an output circuit connected thereto, first and second intermediate condensers, and switching means arranged to connect the plates of said first and second intermediate condensers in alternation to said voltage supply source and in alternation to the plates of said storage condenser, said first intermediate condenser being connected to said voltage supply source while said second intermediate condenser is connected to said storage condenser, and said second intermediate condenser being connected to said voltage supply source while said first intermediate condenser is connected to said storage condenser whereby said storage condenser receives its charging voltage from said intermediate condensers and is never connected directly to said voltage supply source.

(References on following page)

References Cited in the file of this patent

UNITED STATES PATENTS

| | | |
|---|---|---|
| 1,830,170 | Lindenblad | Nov. 3, 1931 |
| 2,419,607 | Terry et al. | Apr. 29, 1947 |
| 2,511,868 | Newsom | June 20, 1950 |
| 2,607,528 | McWhirter et al. | Aug. 19, 1952 |
| 2,615,934 | Mackta | Oct. 28, 1952 |
| 2,662,211 | Marko et al. | Dec. 8, 1953 |
| 2,678,422 | Broomell et al. | May 11, 1954 |
| 2,750,547 | Wannamaker et al. | June 12, 1956 |
| 2,798,198 | Dauphinee | July 2, 1957 |